Jan. 14, 1930.  C. E. TEFFT  1,743,638
HEATER
Filed Aug. 16, 1928  2 Sheets-Sheet 1
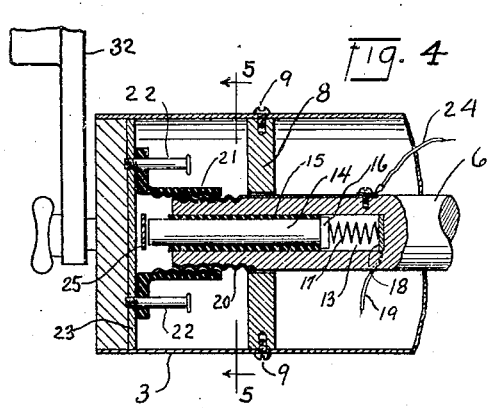
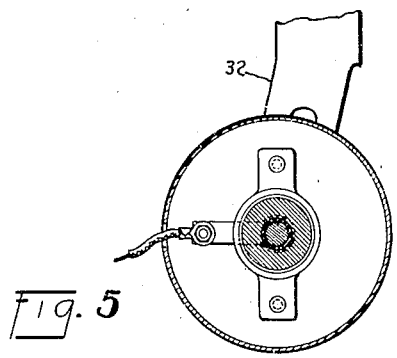
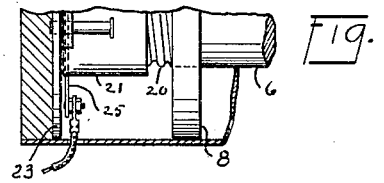
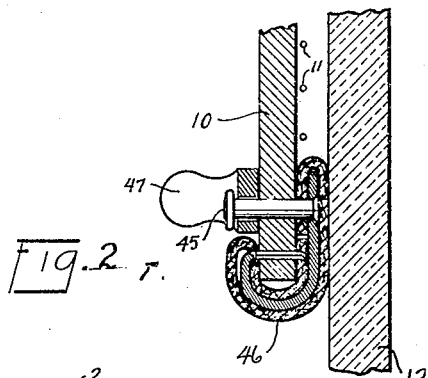
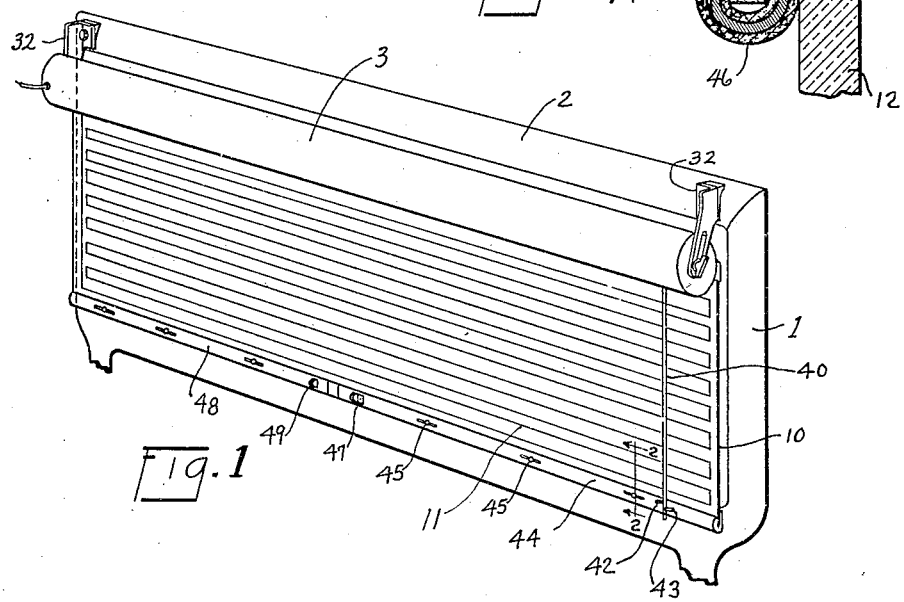
Witness.
INVENTOR.
Clyde E Tefft
BY
ATTORNEY.

Jan. 14, 1930.  C. E. TEFFT  1,743,638
HEATER
Filed Aug. 16, 1928    2 Sheets-Sheet 2
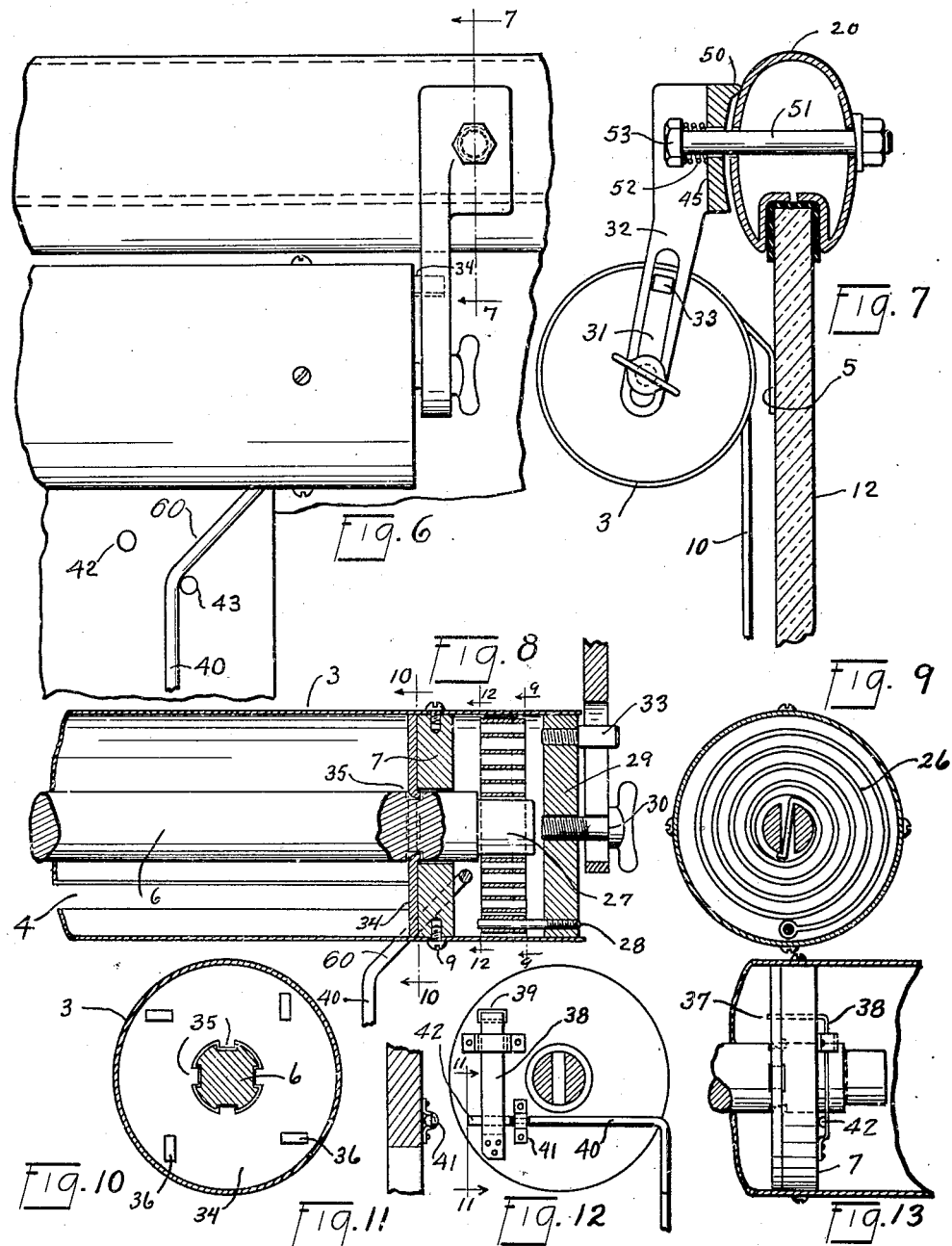
INVENTOR.
Clyde E. Tefft
BY Cyrus N. Rice,
ATTORNEY.
Witness.
Geo. L. Chapel Patented Jan. 14, 1930

1,743,638

UNITED STATES PATENT OFFICE

CLYDE EUGENE TEFFT, OF MUSKEGON, MICHIGAN

HEATER

Application filed August 16, 1928. Serial No. 300,039.

This invention relates to a device for heating a window, particularly an automobile windshield, so as to prevent frost, sleet or snow from accumulating thereon.

The main objects of this invention are to provide an improved heating device which can be readily attached to a windshield or the like; to provide a compact and inconspicuous device which can be mounted so as to be readily withdrawn and extended over the windshield; to provide an improved construction in which the electric circuit to the heating element will be automatically connected and disconnected; and to provide an improved form of manually operable lock for such device.

An illustrative embodiment of this invention is shown in the accompanying drawings, in which:—

Fig. 1 is a view in perspective of my improved device attached to the top edge of an automobile windshield.

Fig. 2 is an enlarged fragmentary sectional detail taken on the line 2—2 of Fig. 1.

Fig. 3 is an enlarged fragmentary detail partly in section of the left end of the housing and mechanism therein.

Fig. 4 is another view of the same, the section being taken on right angles to the plane of the view in Fig. 3.

Fig. 5 is a section taken on the line 5—5 of Fig. 4.

Fig. 6 is an enlarged fragmentary detail in elevation of the right end of the device attached to an automobile windshield.

Fig. 7 is a sectional view taken on the line 7—7 of Fig. 6.

Fig. 8 is an enlarged fragmentary detail taken in vertical longitudinal section of the right end of the device.

Fig. 9 is a sectional view taken on the line 9—9 of Fig. 8.

Fig. 10 is a sectional view taken on the line 10—10 of Fig. 8.

Fig. 11 is a thin sectional view taken on the line 11—11 of Fig. 12.

Fig. 12 is a sectional view taken on the line 12—12 of Fig. 8.

Fig. 13 is an enlarged fragmentary detail of the right end of the device, showing the housing in section and the interior parts in vertical elevation, the winding spring being removed for clearness.

In the construction shown in the drawings an automobile windshield 1 is shown having my improved device attached along the upper edge 2 of the windshield frame.

My improved device comprises an elongated tubular housing 3 which has a longitudinally or axially extending slot 4 at the rear side thereof formed by striking out a flap portion 5. A roller 6 is concentrically journalled within the housing 3 on a pair of disc shaped bearing members 7 and 8 which are secured to the housing 3 by screws 9 which pass through the housing and thread into the bearing discs.

A sheet of transparent dielectric material 10 is secured along one edge to the roller 6 and is adapted to wind therearound and pass through the slot 4. The sheet 10 is adapted to be withdrawn from the housing and rolled up around the roller 6 in the same manner as a blind on a window.

A network of heating element 11 is disposed on the side or face of the sheet 10 which is next to the glass 12 of the windshield for heating the windshield to prevent frost, sleet or snow and the like from accumulating thereon.

Means are provided for automatically connecting and disconnecting the heating element 11 to a suitable source of electric current such as the battery of an automobile, these connections being best shown in Figs. 3, 4 and 5. The left end of the roller 6, as shown in Fig. 4, has an axially disposed passageway 13 therein which houses a rod 14 mounted in a sleeve 15 of insulating material. The inner end of the rod 14 is provided with a head 16 which engages the inner end of the insulated sleeve 15 to limit the outward axial movement of the rod.

A compression spring 17 bears between the head 16 and a metallic contact disc 18 which is electrically connected by a wire 19 to the heating element 11. The tip end of the roller 6 is exteriorly threaded and is provided with a mettallic cap 20 which threadably engages an axially movable socket 21, the base of which is slidably mounted on studs 22 mounted on a stationary base plate 23 carried in the end of the housing 3. The interior of the socket 21 is metal lined in much the same manner as a porcelain receptacle. Said lining is electrically connected to a suitable source of current. The cap 20 is in turn connected by a wire 24 to the opposite side of the circuit of the heating element 11.

The interior of the base of the socket 21 is provided with a centrally located contact 25 insulated from the socket and frame and which is normally in spaced relation to the outer end of the rod 14, said contact being also connected to a suitable source of current such as the opposite side of the automobile battery. Contact 25 is adapted to abut against the end of the rod 14 when the socket 21 is moved axially to the right as viewed in Fig. 4, such movement being caused by the rotation of the roller 6 when the sheet 10 is withdrawn from the housing 3, the contact 25 and end of rod 14 thus acting as an automatic switch for completing the circuit to the heating element 11.

Means are provided for normally tending to rotate the roller 6 in a direction to wind the sheet 10 therearound and comprise a flat spiral spring 26 disposed within the housing 3 at the right hand end thereof. The inner end of the spring 26 fits within an axially disposed slot formed in the reduced end 27 of the roller 6 and the outer end of said spring is attached to a stud 28 threaded in a disc shaped bearing block 29 which acts as a closure for the right end of the housing 3. Member 29 is co-axially drilled and threaded to receive the threaded shank of a thumb screw 30 which fits in a slot 31 of a mounting bracket 32. Member 29 is also provided with a protruding stud 33 near its peripheral edge which also slidably fits within the slot 31 and which thereby prevents rotation of the member 29 under action of the spring 26.

Inward of the bearing member 7, the shaft 6 carries a relatively thin locking disc 34 rigidly secured thereto by a series of inwardly extending lugs 35 which fit within corresponding recesses formed in the peripheral surface of the roller 6. The disc 34 is provided with a series of spaced apertures 36 which are adapted to receive the detent or end 37 of a spring locking member 38 which is secured to the outer face of the bearing 7, the detent 37 extending through an aperture 39 in said bearing.

Means are provided for disengaging or withdrawing the detent 37 of the locking member from the apertures 36 and comprise a lock actuating rod 40 journalled by a clip 41 to the outer face of the bearing 7. The tip end of the rod 40 has a flat side 42 which is disposed snugly against the under side of the locking member 38 near its point of attachment and which is adapted, when rotated, to cam the locking member outwardly so as to withdraw the detent 37 from the locking disc 34. The lock actuating rod 40 extends downwardly and inwardly as shown at 60 in Fig. 8, and thence extends downwardly in a vertical direction as shown most clearly in Fig. 1 so as to lie snugly against the outer face of the sheet 10 when said sheet is in its extended or withdrawn position.

Means are provided for swinging the lock actuating rod 40 to the left as viewed in Fig. 1 for the purpose of releasing the detent 37 from the locking disc 34 and comprise a pair of studs 61 and 62 mounted on a strip 44 which in turn is slidably mounted on studs 45. The studs 45 extend through the sheet 10 and through a suitable marginal binding 46 which preferably has a sheet metal core covered with felt cloth or the like.

The strip 44 extends about half way across the lower marginal edge of the sheet 10 and near its inner end is provided with an outstanding lug 47 which is adapted to be grasped by the user of the device for shifting the strip axially to actuate the rod 40. The opposite marginal portion of the sheet 10 is also provided with a binding strip 48 which has a lug 49 near its inner end and in spaced relation to the lug 47 so that the two lugs can be pinched toward each other by the thumb and finger of the user.

The studs 61 and 63 are offset in both a vertical and horizontal plane so that when the roller 6 is unlocked by swinging the lower end of the rod 40 to the left, the studs will pass up along the opposite sides of the rod until the part 60 thereof is reached as shown most clearly in Fig. 6 at which time the stud 43 will engage the slanting portion 60 of the rod 40 and cause the rod 40 to be swung through a 90° arc in a right hand direction; that is, in an inward and upward direction as viewed in Fig. 1 so as to cause the rod 40 to fit snugly up under the rear side of the housing 3.

As shown most clearly in Fig. 7, the mounting brackets 32 for the housing 3 are provided at their upper edge with an inwardly extending toe 50 which contacts with the windshield frame 2. A mounting bolt 51 extends transversely through the frame 2 and through the upper end of the brackets 32. A helical compression spring 52 surrounds the mounting bolt 51 and bears between the under side of its head 53 and the outer face 54 of the bracket so as to resiliently or yieldingly urge the bracket inwardly; that is, to the right as viewed in Fig. 7 so as to cause the housing 3 to snugly bear against the windshield glass 12.

In the operation of this device, the housing 3 with its mechanism therein is mounted by the brackets 32 to the windshield frame 2, and the current leads at the left end of the housing are connected to a suitable source of current. When it is desired to place the device in operation, the lugs 47 and 49 are grasped by the operator and the sheet 10 is withdrawn downwardly out of the housing 3 across the face of the windshield glass 12. Withdrawing of the sheet 10 rotates the roller 6 against the action of the spring 26 and such rotation causes the socket 21 to move inwardly on its supporting studs 22, thereby bringing the contact 25 into engagement with the end of the rod 14 thus completing the circuit from the source of current to the heating element 11.

Release of the lug 47 permits the strip 44 to move to the right and thereby swing the rod 40 to a position in which the flattened end 42 is parallel to the face of the locking member 38, thus permitting the detent 37 to enter one of the apertures 36 in the locking disc 34, thereby locking the roller 6 against rotation.

When it is desired to return the sheet and heating element to its housing, the lugs 47 and 49 are grasped by the fingers of the operator and pinched toward each other, thereby sliding the strip 44 to the left, thus causing the stud 62 to swing the lower end of the rod 40 to the left a sufficient distance to cause its end 42 to cam the detent 37 out of engagement with the locking disc 34. When the roller has been unlocked the spiral spring 26 being under tension, will rotate the roller 6 and thereby roll the sheet 10 with its heating element therearound. When the lower edge of the sheet approaches the housing 3, the stud 43 engages the angularly disposed portion 60 of the rod and swings it to the left and upward; that is, in a right hand direction so as to cause the rod 40 to be snugly housed in a horizontal plane at the rear of the housing 3. Rolling up of the sheet 10 also causes the socket 21 to move to the left as viewed in Fig. 4 so as to disconnect or open the circuit to the source of electric current.

Although but one specific embodiment of this invention has been herein shown and described, it will be understood that numerous details of the construction shown may be altered or omitted without departing from the spirit of this invention as defined by the following claims.

I claim:

1. A device of the class described comprising a housing having a longitudinal slot therein, a roller journalled in said housing, a flexible transparent dielectric sheet attached along one edge to said roller and adapted to pass through said slot, a network of electrical heating elements attached to one side of said sheet, a spring for rotating said roller to wind said sheet therearound, a lock for restraining rotation of said roller and manually operable means for releasing said lock.

2. A device as set forth in claim 1 which includes a switch for automatically closing the circuit to said heating element when said sheet is withdrawn from said housing.

3. A device of the class described comprising a roller, a flexible transparent dielectric sheet attached along one edge to said roller, a net work of electrical heating element attached to one side of said sheet, a spring for rotating said roller to wind said sheet therearound, a lock for restraining rotation of said roller and manually operable means for releasing said lock.

In testimony whereof I have hereunto set my hand at Grand Rapids, Michigan, this 13th day of August, 1928.

CLYDE EUGENE TEFFT.